United States Patent
Murata et al.

(10) Patent No.: US 9,248,387 B2
(45) Date of Patent: Feb. 2, 2016

(54) FILTER CLEANING APPARATUS

(75) Inventors: Atsushi Murata, Tokyo (JP); Eiichi Yamada, Tokyo (JP); Shinji Fukumoto, Tokyo (JP)

(73) Assignees: Japan Oil, Gas and Metals National Corporation, Tokyo (JP); INPEX CORPORATION, Tokyo (JP); JX Nippon Oil & Energy Corporation, Tokyo (JP); Japan Petroleum Exploration Co., Ltd., Tokyo (JP); COSMO OIL CO., LTD., Tokyo (JP); NIPPON STEEL & SUMIKIN ENGINEERING CO., LTD., Tokyo (JP)

( * ) Notice: Subject to any disclaimer, the term of this patent is extended or adjusted under 35 U.S.C. 154(b) by 170 days.

(21) Appl. No.: 14/236,669

(22) PCT Filed: Aug. 2, 2012

(86) PCT No.: PCT/JP2012/069736
§ 371 (c)(1),
(2), (4) Date: Feb. 3, 2014

(87) PCT Pub. No.: WO2013/021916
PCT Pub. Date: Feb. 14, 2013

(65) Prior Publication Data
US 2014/0183124 A1    Jul. 3, 2014

(30) Foreign Application Priority Data
Aug. 5, 2011    (JP) .................................. 2011-171811

(51) Int. Cl.
*B01D 29/66*    (2006.01)
*B01D 35/12*    (2006.01)
(Continued)

(52) U.S. Cl.
CPC .............. *B01D 29/668* (2013.01); *B01D 29/66* (2013.01); *C10G 2/00* (2013.01); *C10G 31/09* (2013.01); *B01D 35/027* (2013.01); *B01D 35/12* (2013.01); *C10G 2300/1022* (2013.01)

(58) Field of Classification Search
None
See application file for complete search history.

(56) References Cited

U.S. PATENT DOCUMENTS

| 5,599,849 A | 2/1997 | Jager et al. |
| 5,935,418 A | 8/1999 | Chakrabarty et al. |

(Continued)

FOREIGN PATENT DOCUMENTS

| CN | 101396647 A | 4/2009 |
| CN | 102258963 A | 11/2011 |

(Continued)

OTHER PUBLICATIONS

Int'l Search Report and Written Opinion issued Nov. 6, 2012 in Int'l Application No. PCT/JP2012/069736.

(Continued)

*Primary Examiner* — Thomas M Lithgow
(74) *Attorney, Agent, or Firm* — Panitch Schwarze Belisario & Nadel LLP

(57) ABSTRACT

A filter cleaning apparatus used in a reaction system including; a reaction tank having a filter, first feed line connected to the filter at one end, a recovery tank connected to the other end of the first feed line, and second feed line connected to the recovery tank at one end, is provided. The filter cleaning apparatus includes; first return line connected the second feed line at one end, first and second reverse cleaning solution tanks connected to the first return line, a first flow rate adjusting valve that can adjust filtered fluid to be supplied to the first reverse cleaning solution tank, a second flow rate adjusting valve that can adjust filtered fluid to be supplied to the second reverse cleaning solution tank, and a switching section that carries either one of the filtered fluids accommodated in these reverse cleaning solution tanks by switching.

4 Claims, 3 Drawing Sheets

(51) Int. Cl.
*B01D 35/027* (2006.01)
*C10G 2/00* (2006.01)
*C10G 31/09* (2006.01)

(56) References Cited

U.S. PATENT DOCUMENTS

| | | |
|---|---|---|
| 6,462,098 B1 | 10/2002 | Vogel et al. |
| 6,652,760 B2 * | 11/2003 | Anderson .............. B01D 29/15 210/323.2 |
| 7,488,760 B2 * | 2/2009 | Vogel .................... B01D 29/33 518/700 |
| 2002/0128330 A1 | 9/2002 | Anderson |
| 2005/0080149 A1 | 4/2005 | Degeorge et al. |
| 2009/0261046 A1 | 10/2009 | Minnie et al. |
| 2010/0160459 A1 * | 6/2010 | Hammond .............. C10G 2/342 518/700 |
| 2011/0044859 A1 * | 2/2011 | Onishi .................. B01D 39/10 422/187 |

FOREIGN PATENT DOCUMENTS

| | | |
|---|---|---|
| EP | 0609079 A1 | 8/1994 |
| EP | 2258812 A1 | 12/2010 |
| JP | H07-800 A | 1/1995 |
| JP | 2002-535112 A | 10/2002 |
| JP | 2005-507434 A | 3/2005 |
| JP | 2009-509765 A | 3/2009 |

OTHER PUBLICATIONS

Office Action issued Feb. 2, 2015 in CN Application No. 201280037561.8.
Extended European Search Report issued Mar. 11, 2015 in EP Application No. 12822498.7.

* cited by examiner

FILTER CLEANING APPARATUS

CROSS-REFERENCE TO RELATED APPLICATION

This application is a Section 371 of International Application No. PCT/JP2012/069736, filed Aug. 2, 2012, which was published in the Japanese language on Feb. 14, 2013, under International Publication No. WO 2013/021916 A1, and the disclosure of which is incorporated herein by reference

TECHNICAL FIELD

The present invention relates to a filter cleaning apparatus that removes a catalyst from a filter.

Priority is claimed on Japanese Patent Application No. 2011-171811, filed Aug. 5, 2011, the content of which is incorporated herein by reference.

BACKGROUND ART

A catalyst is used in various fields for promoting a chemical reaction. There are a variety of shapes for the catalyst and various methods of use. There are cases in which a block catalyst is supported in a reaction container so as not to move, and cases in which a fine granular catalyst is stirred together with a reaction solution.

Recently, as a method for synthesizing liquid fuel from natural gas, a liquid fuel synthesis system (reaction system) using a bubble-column reactor (reaction tank) has been developed. A granular catalyst is used also in the bubble-column reactor.

In the liquid fuel synthesis system, a GTL (gas to liquids) technique has been used in which natural gas is reformed to produce a synthesis gas containing hydrogen gas ($H_2$) and carbon monoxide gas (CO) as the main components, and this synthesis gas is used as a source gas to synthesize carbon hydride in a bubble-column reactor by using a catalyst based on a Fischer-Tropsch synthesis reaction (hereinafter, referred to as "FT synthesis reaction"). Further, this carbon hydride is hydrogenized and purified, thereby manufacturing liquid fuel products such as naphtha (crude gasoline), kerosene, light gas oil, and wax.

Generally, a filter that filters a catalyst is provided in the bubble-column reactor to prevent the catalyst from flowing out to a subsequent facility. When a filter is used, the filter clogs over time due to the catalyst. Hence, the catalyst needs to be removed regularly from the filter. As such a filter cleaning apparatus, for example, the one described in Patent Document 1 is well-known.

In Patent Document 1, several embodiments relating to the filter cleaning apparatus are disclosed.

In the filter cleaning apparatus in one embodiment, a reactor (reaction tank) and a filtrate recovery drum (recovery tank) are connected by feeding line.

In the embodiment, after oil filtered by a filter in the reactor (filtered fluid) is supplied from the reactor to the filtrate recovery drum for a certain period of time, a catalyst adhered to the filter is removed by performing a reverse cleaning operation in which pressure in the filtrate recovery drum is raised higher than that in the reactor, to supply oil from the filtrate recovery drum to the reactor.

However, in the embodiment, there is a problem in that the filter cannot be cleaned while oil is being supplied from the reactor to the filtrate recovery drum.

PRIOR ART DOCUMENT

Patent Document

[Patent Document 1] U.S. Pat. No. 6,462,098

DISCLOSURE OF INVENTION

Problems to be Solved by the Invention

In order to solve the problem, another embodiment of the filter cleaning apparatus is disclosed in Patent Document 1. In the other embodiment, a filter cleaning apparatus includes a reverse cleaning drum (first reverse cleaning solution tank) connected to a reactor by feeding line, in addition to the configuration of the one embodiment. Although not described in detail in the embodiment, oil in a filtrate recovery drum needs to be supplied to the reverse cleaning drum. At this time, a pump for pressurizing oil in the filtrate recovery drum is required, or a device that releases pressure in the reverse cleaning drum to thereby supply oil from the filtrate recovery drum to the reverse cleaning drum due to a pressure difference, and thereafter, pressurizes the filtrate recovery drum is required.

In the case of including the pump in the former case, when the pump is broken down, the reverse cleaning operation cannot be performed. Hence, the filter is blocked and a fluid level in the reactor increases, and the entire device needs to be shut down.

On the other hand, when pressure in the reverse cleaning drum is released or applied, an interval (time cycle) of the reverse cleaning operation increases, and the filter is likely to be blocked.

In view of the above situation, it is an object of the present invention to provide a filter cleaning apparatus that can shorten an interval of a reverse cleaning operation without providing a pump for boosting the pressure of filtered fluid.

Means for Solving the Problems

A filter cleaning apparatus included in a reaction system, the reaction system being provided with: a reaction tank that can accommodate a catalyst and a formed body formed by a chemical reaction using the catalyst and that has a filter that filters the catalyst therein; a first feed line that is connected to the filter at one end and that feeds filtered fluid that has passed through the filter; a recovery tank that is connected to the other end of the first feed line and that accommodates the filtered fluid; and a second feed line that is connected to the recovery tank at one end and that feeds out the filtered fluid from the other end. the filter cleaning apparatus configured to remove the catalyst adhered to the filter, includes: a first return line connected to an intermediate part of the second feed line at one end to feed the filtered fluid; a first reverse cleaning solution tank and a second reverse cleaning solution tank connected to the first return line and supplied with the filtered fluid; a first flow rate adjusting valve that can adjust a flow rate of the filtered fluid to be supplied from the first return line to the first reverse cleaning solution tank; a second flow rate adjusting valve that can adjust a flow rate of the filtered fluid to be supplied from the first return line to the second reverse cleaning solution tank; a switching section connected to the first reverse cleaning solution tank and the second reverse cleaning solution tank to feed either one of the filtered fluids accommodated in the first reverse cleaning solution tank and the second reverse cleaning solution tank by switching; second return line connected to the switching section at one end, provided with a returning on-off valve at an intermediate part, and connected to an intermediate part of the first feed line at the other end; and a discharging on-off valve provided on the first feed line so as to be closer to the other end of the first feed line than a portion of the first feed line at which the other end of the second return line is connected.

For example, explanation will be given in a state in which filtered fluid is sufficiently accommodated in the first reverse cleaning solution tank, and filtered fluid in the second reverse cleaning solution tank is insufficient, and the switching section is switched so as to feed filtered fluid accommodated in the first reverse cleaning solution tank. At this time, pressure in the first reverse cleaning solution tank is high and pressure in the second reverse cleaning solution tank is low with respect to the pressure in the reaction tank. Moreover, the pressure in the reaction tank is high and the pressure in the second reverse cleaning solution tank is low with respect to the pressure in the recovery tank.

In a filtering operation in which the returning on-off valve is in a closed state, that is, in a state in which filtered fluid does not flow in the second return line, and the discharging on-off valve is in an opened state, that is, in a state in which filtered fluid flows in the first feed line, a formed body formed in the reaction tank is contained in filtered fluid that has passed through the filter and been fed by the first feed line due to a pressure difference between the reaction tank and the recovery tank. At this time, the catalyst is adhered to the filter. Meanwhile, filtered fluid fed by the first feed line is accommodated in the recovery tank, and is fed out from the second feed line and used for products and the like.

After performing the filtering operation for a certain period of time, the discharging on-off valve is switched to a closed state and the returning on-off valve is switched to an opened state, to thereby perform the reverse cleaning operation in which filtered fluid accommodated in the first reverse cleaning solution tank is fed to one end side of the first feed line via the switching section and the second return line due to a pressure difference between the first reverse cleaning solution tank and the reaction tank, passes through the filter, and flows into the reaction tank. At this time, the catalyst adhered to the filter is removed and flows into the reaction tank.

After the filtering operation performed immediately before the reverse cleaning operation, a pressure/cleaning solution replenishment operation of the second reverse cleaning solution tank explained below is performed. That is to say, the pressure in the second reverse cleaning solution tank is set to be lower than the pressure in the recovery tank (depressurization), and the second flow rate adjusting valve is switched to the opened state, thereby replenishing a part of filtered fluid fed by the second feed line, to the second reverse cleaning solution tank via the first return line, due to a pressure difference between the recovery tank and the second reverse cleaning solution tank (replenishment of the cleaning solution). Moreover, the pressure in the second reverse cleaning solution tank is set to be higher than the pressure in the reaction tank (pressure rising), and this state is held for a certain period of time.

The filtering operation and the reverse cleaning operation using filtered fluid in the first reverse cleaning solution tank are combined as a set and at least one set is performed, and when filtered fluid in the first reverse cleaning solution tank becomes insufficient, the switching section is switched so that filtered fluid accommodated in the second reverse cleaning solution tank is fed.

After performing the filtering operation for a certain period of time, the discharging on-off valve is switched to the closed state and the returning on-off valve is switched to the opened state, to thereby perform the reverse cleaning operation for removing the catalyst adhered to the filter using filtered fluid accommodated in the second reverse cleaning solution tank and using a pressure difference between the second cleaning solution tank and the reaction tank.

After the filtering operation performed immediately before the reverse cleaning operation, the pressure/cleaning solution replenishment operation of the first reverse cleaning solution tank is performed. That is to say, the pressure in the first reverse cleaning solution tank is set to be lower than the pressure in the recovery tank (depressurization), and the first flow rate adjusting valve is switched to the opened state, thereby replenishing a part of filtered fluid feed by the second feed line to the first reverse cleaning solution tank (replenishment of the cleaning solution). Moreover, the pressure in the first reverse cleaning solution tank is set to be higher than the pressure in the reaction tank (pressure rising), and this state is held for a certain period of time.

The filtering operation and the reverse cleaning operation using filtered fluid in the second reverse cleaning solution tank are combined as a set and at least one set is performed, and when filtered fluid in the second reverse cleaning solution tank becomes insufficient, the switching section is switched so that filtered fluid accommodated in the first reverse cleaning solution tank is fed.

Moreover, in the filter cleaning apparatus described above, it is desired to provide a buffer tank for accommodating the filtered fluid, on one end side of the second feed line from a portion of the second feed line to which one end of the first return line is connected.

In the filter cleaning apparatus described above, the reaction tank has a first filter and a second filter as the filter, and the first feed line includes: first auxiliary feed line connected to the first filter at one end; second auxiliary feed line connected to the second filter at one end; and main feed line connected to the other end of the first auxiliary feed line and the other end of the second auxiliary feed line at one end, and connected to the recovery tank at the other end. The second return line includes: main return line connected to the switching section at one end; first auxiliary return line connected to the other end of the main return line at one end, and connected to an intermediate part of the first auxiliary feed line at the other end; and second auxiliary return line connected to the other end of the main return line at one end, and connected to an intermediate part of the second auxiliary feed line at the other end. The filter cleaning apparatus preferably includes, as the returning on-off valve, a first returning on-off valve provided at an intermediate part of the first auxiliary return line, and a second returning on-off valve provided at an intermediate part of the second auxiliary return line. The filter cleaning apparatus preferably includes, as the discharging on-off valve, a first discharging on-off valve provided on the other end side of the first auxiliary feed line from a portion thereof to which the other end of the first auxiliary return line is connected, and a second discharging on-off valve provided on the other end side of the second auxiliary feed line from a portion thereof to which the other end of the second auxiliary return line is connected. In this case, two filters are provided in the reaction tank, and the time for cleaning these filters can be staggered from each other.

Effect of the Invention

According to the filter cleaning apparatus of the present invention, the pressure/cleaning solution replenishment operation of the second reverse cleaning solution tank is performed while the filtering operation and the reverse cleaning operation using filtered fluid in the first reverse cleaning solution tank are performed as a set and at least one set is being performed to remove the catalyst adhered to the filter. Further, the pressure/cleaning solution replenishment operation of the first reverse cleaning solution tank is performed while the filtering operation and the reverse cleaning operation using filtered fluid in the second reverse cleaning solution tank are performed as a set and at least one set is being performed to remove the catalyst adhered to the filter. These operations are repeated alternately. As a result, a situation in which the catalyst adhered to the filter cannot be removed while supplying filtered fluid into the reverse cleaning solution tank can be prevented, thereby enabling to decrease the interval of the reverse cleaning operation.

Moreover, because the pressure in the reverse cleaning solution tank needs only to be increased or decreased, a pump need not be provided as in the conventional filter cleaning apparatus.

According to the filter cleaning apparatus of the present invention, filtered fluid can be replenished into the first reverse cleaning solution tank and the second reverse cleaning solution tank in a short period of time, by supplying filtered fluid after a sufficient amount of filtered fluid is stored in the buffer tank.

Moreover, according to the filter cleaning apparatus of the present invention, blockage of the filter can be effectively prevented, and by stabilizing the height of fluid level in the reaction tank, production speed (production amount per unit time) of a formed body can be stabilized.

BEST MODE FOR CARRYING OUT THE INVENTION (First Embodiment)

Hereunder, a first embodiment of a filter cleaning apparatus (hereinafter, also referred to as "cleaning device") and a liquid fuel synthesis system (reaction system) using the cleaning device according to the present invention will be explained with reference to FIG. 1 to FIG. 3. The liquid fuel synthesis system synthesizes carbon hydride from hydrogen gas and carbon monoxide gas by the FT synthesis reaction.

Hereunder, for convenience of explanation, a case in which two filters are provided will be explained.

Moreover, parts having the same configuration are denoted by a common reference number, with different letters of the alphabet such as "A", "B" being added to the number, and the same explanation will be omitted.

Figure 1:
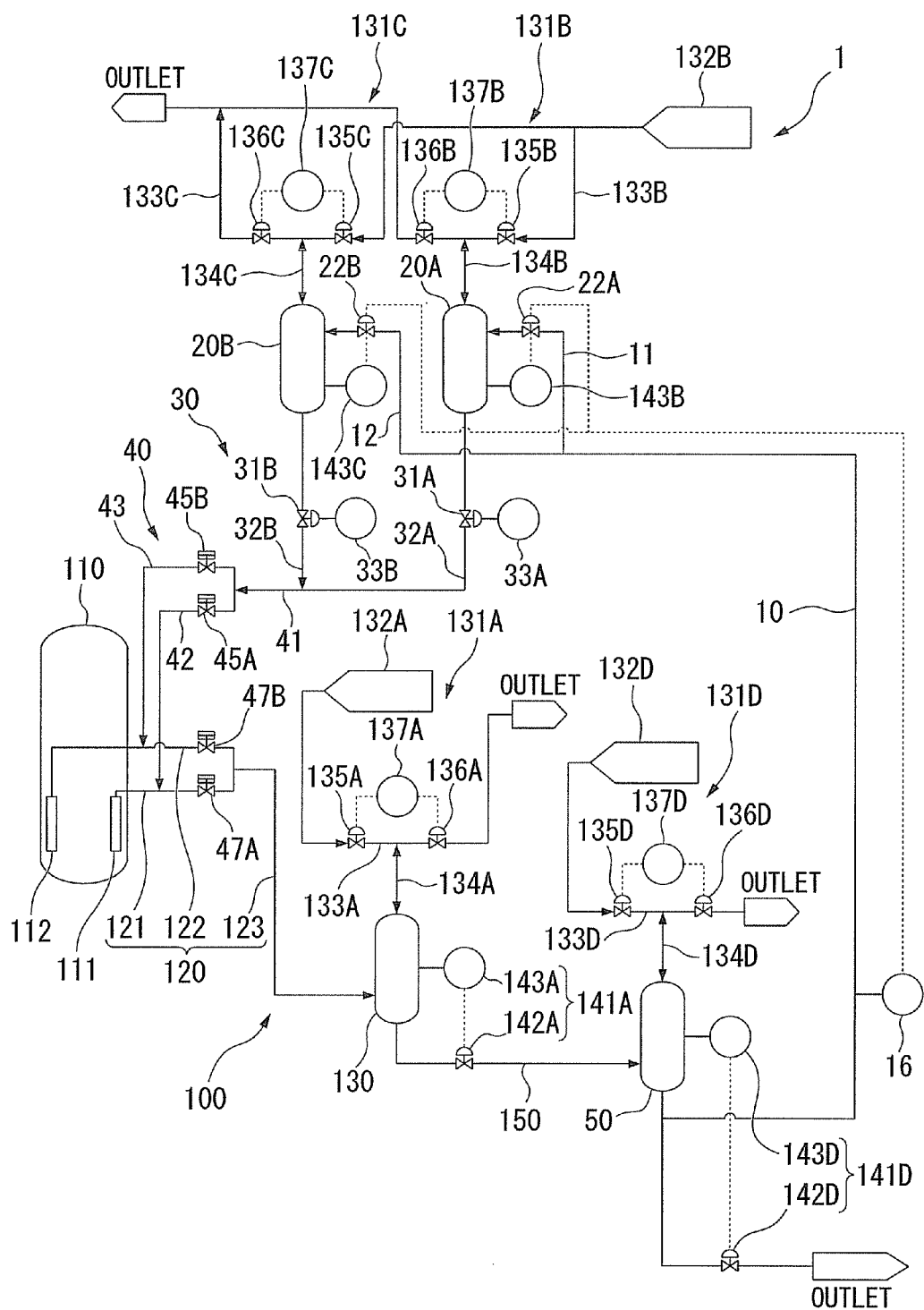
FIG. 1 is a diagram for explaining a liquid fuel synthesis system using a filter cleaning apparatus of a first embodiment of the present invention.

As shown in FIG. 1, a liquid fuel synthesis system 100 includes: a reactor (reaction tank) 110 having a first filter 111 and a second filter 112 therein; first feed line 120 that is connected to the reactor 110 to feed filtered fluid (described later) that has passed through the filters 111 and 112; a first gas-liquid separation tank (recovery tank) 130 that accommodates fed filtered fluid; and second feed line 150 that is connected to the first gas-liquid separation tank 130 at one end, and feeds out filtered fluid from the other end.

The reactor 110 includes raw material supply line (not shown), and slurry formed by suspending a catalyst is accommodated in the reactor 110.

Hydrogen gas and carbon monoxide gas described above are supplied from the raw material supply line, and these gases are injected from the bottom of the slurry. Hydrogen gas and carbon monoxide gas come in contact with the catalyst to cause the FT synthesis reaction according to the following chemical reaction formula (1) to produce a formed body such as carbon hydride in a gas or liquid form.

$$2n\mathrm{H}_2 + n\mathrm{CO} \rightarrow (\!-\mathrm{CH}_2\!-\!)_n + n\mathrm{H}_2\mathrm{O} \qquad (1)$$

The filters 111 and 112 are for filtering the catalyst. In the present embodiment, for example, a Co (cobalt) catalyst can be used as the catalyst, and a sintered metallic filter can be used as the filters 111 and 112.

The first filter 111 and the second filter 112 correspond to the filter.

The aforementioned filtered fluid fed by the first feed line 120 is obtained by filtering the catalyst from the slurry and the formed body in the reactor 110.

The first feed line 120 includes; first auxiliary feed line 121 with one end being connected to the first filter 111, second auxiliary feed line 122 with one end being connected to the second filter 112, and main feed line 123 with one end being connected to the other end of the first auxiliary feed line 121 and the other end of the second auxiliary feed line 122, and the other end thereof being connected to the gas-liquid separation tank 130.

In the first feed line 120 configured in this manner, fluid to be fed by the first auxiliary feed line 121 and the second auxiliary feed line 122 flows into the main feed line 123 and is mixed, or fluid to be fed by the main feed line 123 is branched into the first auxiliary feed line 121 and the second auxiliary feed line 122.

The gas-liquid separation tank 130 is configured to be able to accommodate filtered fluid therein.

A pressure adjusting section 131A and a fluid level adjusting section 141A are fitted to the gas-liquid separation tank 130.

The pressure adjusting section 131A includes; pressure adjusting line 133A attached to a gas cylinder 132A at one end, with the other end being opened as an outlet, connection line 134A for connecting the center of the pressure adjusting line 133A to the first gas-liquid separation tank 130, on-off valves 135A and 136A provided in the pressure adjusting line 133A, and a pressure control section 137A that controls the on-off valves 135A and 136A. In the pressure adjusting line 133A, the on-off valve 135A is provided on one end side with respect to a connection part between the pressure adjusting line 133A and the connection line 134A, and the on-off valve 136A is provided on the other end side.

The gas cylinder 132A is filled with compressed gas having, for example, a gauge pressure of 3.6 MPaG. $N_2$ (nitrogen) gas can be favorably used as compressed gas. The pressure control section 137A can switch the on-off valves 135A and 136A independently to an opened state or a closed state. The pressure control section 137A can be remote controlled by operating a panel provided in the control section (not shown).

The pressure adjusting section 131A configured in this manner can supply compressed gas in the gas cylinder 132A into the gas-liquid separation tank 130 through the pressure adjusting line 133A and the connection line 134A by switching the on-off valve 135A to the opened state and the on-off valve 136A to the closed state. Moreover gas in the gas-liquid separation tank 130 can be released to the atmosphere through the connection line 134A and the pressure adjusting line 133A by switching the on-off valve 135A to the closed state and the on-off valve 136A to the opened state.

The fluid level adjusting section 141A includes an on-off valve 142A provided in the second feed line 150 and a fluid level control section 143A that detects the height of fluid level of filtered fluid in the first gas-liquid separation tank 130 and controls the on-off valve 142A. Filtered fluid in the first gas-liquid separation tank 130 flows out, passing through the second feed line 150 by switching the on-off valve 142A to the opened state, and filtered fluid does not flow out from the first gas-liquid separation tank 130 by switching the on-off valve 142A to the closed state.

The fluid level control section 143A includes a well-known level sensor, and can remote control the fluid level control section 143A from the aforementioned panel.

Subsequently, a cleaning device 1 to be used in the liquid fuel synthesis system 100 will be explained next.

The cleaning device 1 includes; first return line 10 with one end being connected to an intermediate part of the second feed line 150, a first reverse cleaning drum 20A (first reverse cleaning solution tank) and a second reverse cleaning drum 20B (second reverse cleaning solution tank) connected to the first return line 10 and supplied with filtered fluid, a first flow rate adjusting valve 22A and a second flow rate adjusting valve 22B provided in the first return line 10, a switching section 30 connected to the reverse cleaning drums 20A and 20B, second return line 40 connected to the switching section 30 at one end, and discharging on-off valves 47A and 47B provided in the first feed line 120.

One end of the first return line 10 is connected to the other end side of the second feed line 150 from a portion where the on-off valve 142A is provided in the second feed line 150.

A flow rate control section 16 is connected to the first return line 10. The flow rate control section 16 can detect a flow rate of filtered fluid fed by the first return line 10, and control the first flow rate adjusting valves 22A and 22B.

The other end of the first return line 10 is branched into two, namely first branch line 11 and second branch line 12, so that filtered fluid fed from the one end side of the first return line 10 is branched and fed into the first branch line 11 and the second branch line 12.

The first reverse cleaning drum 20A is connected to the end of the first branch line 11, and the aforementioned first flow rate adjusting valve 22A is provided in the first branch line 11. Similarly, the second reverse cleaning drum 20B is connected to the end of the second branch line 12, and the aforementioned second flow rate adjusting valve 22B is provided in the second branch line 12.

The first flow rate adjusting valve 22A can adjust the flow rate of filtered fluid supplied from the first return line 10 to the first reverse cleaning drum 20A through the first branch line 11. The second flow rate adjusting valve 22B can adjust the flow rate of filtered fluid supplied from the first return line 10 to the second reverse cleaning drum 20B through the second branch line 12.

The pressure adjusting section 131B and a fluid level control section 143B are fitted to the first reverse cleaning drum 20A. The fluid level control section 143B detects the height of fluid level of filtered fluid in the first reverse cleaning drum 20A and controls the first flow rate adjusting valve 22A based on a detection result thereof.

The pressure adjusting section 131C and a fluid level control section 143C are fitted to the second reverse cleaning drum 20B. The fluid level control section 143C detects the height of the fluid level of filtered fluid in the second reverse cleaning drum 20B and controls the second flow rate adjusting valve 22B based on a detection result thereof.

In this example, in order to supply compressed gas having the same pressure to the reverse cleaning drums 20A and 20B, in the pressure adjusting sections 131B and 131C, one end of the pressure adjusting line 133B and one end of the pressure adjusting line 133C are fitted to one gas cylinder 132B. On the other hand, the other end of the pressure adjusting line 133B and the other end of the pressure adjusting line 133C are connected to each other and are released to the atmosphere.

The height of the fluid level of filtered fluid when a sufficient amount of filtered fluid is accommodated in the reverse cleaning drums 20A and 20B is referred to as "high position H", and the height of the fluid level when filtered fluid in the reverse cleaning drums 20A and 20B is insufficient is referred to as "low position L".

Compressed gas of, for example, 4.2 MPaG is filled in the gas cylinder 132B.

The switching section 30 includes; first switching line 32A connected to the first reverse cleaning drum 20A at one end and provided with an on-off valve 31A in an intermediate part thereof, and second switching line 32B connected to the second reverse cleaning drum 20B at one end and provided with an on-off valve 31B in an intermediate part thereof.

The other end of the first switching line 32A and the other end of the second switching line 32B are connected to each other.

A switching control section 33A is connected to the on-off valve 31A and a switching control section 33B is connected to the on-off valve 31B, so that the switching control sections 33A and 33B can be remote controlled from the aforementioned panel. Either one of filtered fluid accommodated in the first reverse cleaning drum 20A and filtered fluid accommodated in the second reverse cleaning drum 20B can be switched and fed by switching one of the on-off valves 31A and 31B to the opened state and the other to the closed state.

The second return line 40 includes; main return line 41 connected to the other end of the first switching line 32A at one end, first auxiliary return line 42 connected to the other end of the main return line 41 at one end and connected to an intermediate part of the first auxiliary feed line 121 at the other end, and second auxiliary return line 43 connected to the other end of the main return line 41 at one end and connected to an intermediate part of the second auxiliary feed line 122 at the other end.

A first returning on-off valve 45A is connected to an intermediate part of the first auxiliary return line 42, and a second returning on-off valve 45B is connected to an intermediate part of the second auxiliary return line 43.

The first returning on-off valve 45A and the second returning on-off valve 45B correspond to the returning on-off valve.

The first discharging on-off valve 47A is provided on the other end side of the first auxiliary feed line 121 from a portion to which the other end of the first auxiliary return line 42 is connected.

The second discharging on-off valve 47B is provided on the other end side of the second auxiliary feed line 122 from a portion to which the other end of the second auxiliary return line 43 is connected.

The first discharging on-off valve 47A and the second discharging on-off valve 47B correspond to the discharging on-off valve.

The cleaning device 1 includes a second gas-liquid separation tank (buffer tank) 50 that accommodates filtered fluid, between a portion to which one end of the first return line 10 is connected and a portion where the on-off valve 142A is provided in the second feed line 150.

A pressure adjusting section 131D and a fluid level adjusting section 141D are fitted to the second gas-liquid separation tank 50.

Compressed gas having, for example, a gauge pressure of 1.0 MPaG is filled in a gas cylinder 132D. The on-off valve 142A is provided on the second feed line 150 so as to be closer to the first gas-liquid separation tank 130 than a portion to which one end of the first return line 10.

The pressure control sections 137A, 137B, 137C, and 137D, the fluid level control sections 143A, 143B, 143C, and 143D, the switching control sections 33A and 33B, the flow rate control section 16, the returning on-off valves 45A and 45B, and the discharging on-off valves 47A and 47B can be remote controlled by the panel.

Next operations of the liquid fuel synthesis system 100 and the cleaning device 1 constructed as described above will be explained below, while indicating a specific pressure. Operating pressure of the liquid fuel synthesis system 100 and the cleaning device 1 is not limited to the pressure described below.

Figure 2:
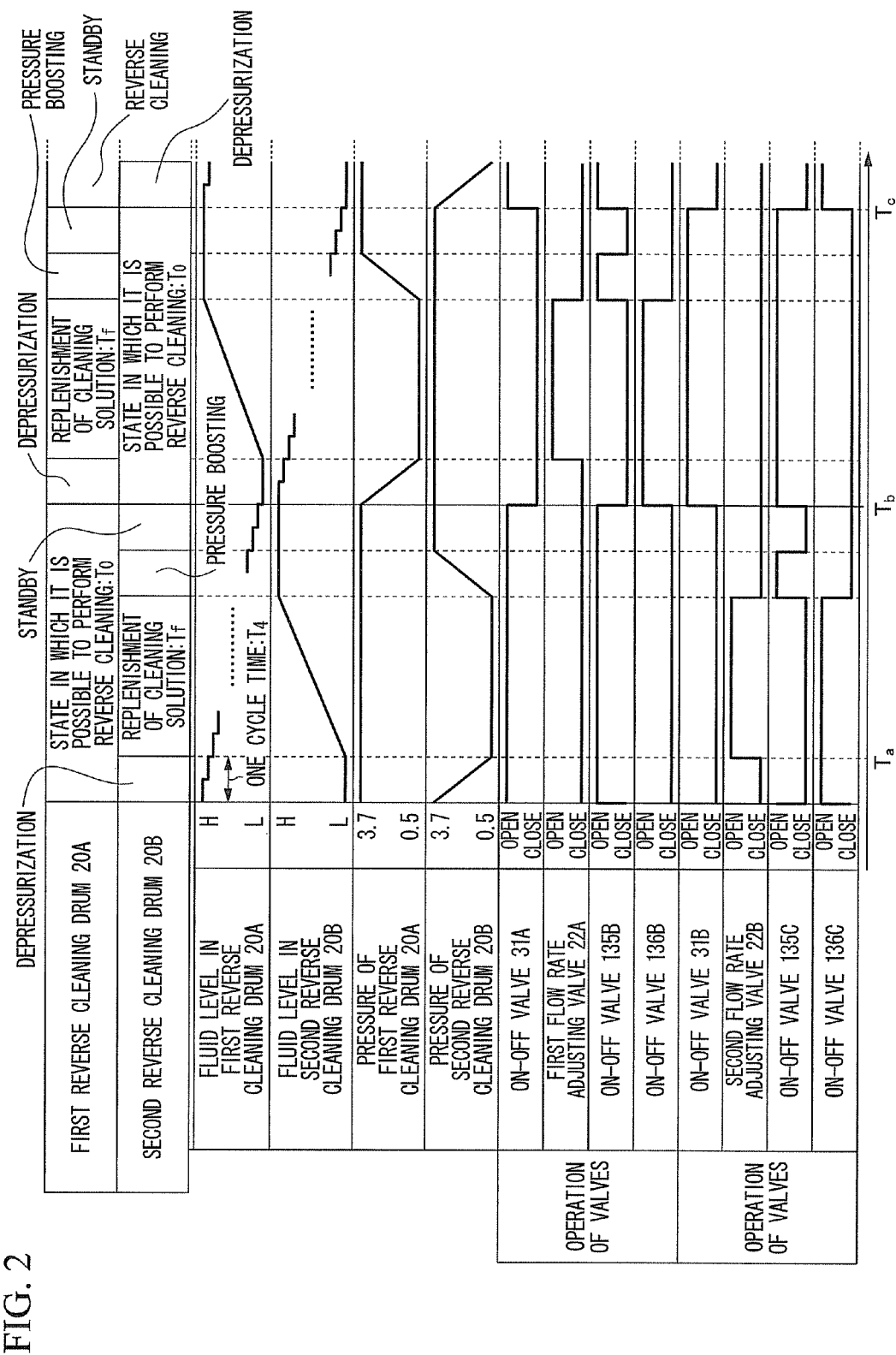
FIG. 2 is a diagram for explaining an operation of the filter cleaning apparatus.

FIG. 2 is a diagram for explaining the operation of the cleaning device 1. FIG. 3 is a diagram for explaining operations of the filters 111 and 112 of the cleaning device 1.

It is assumed here that as initial conditions, in the first reverse cleaning drum 20A, the height of the fluid level of filtered fluid is set to the high position H and the internal pressure is 3.7 MPaG due to compressed gas, and in the second reverse cleaning drum 20B, the height of the fluid level of filtered fluid is set to the low position L and the internal pressure is 3.7 MPaG. Internal pressures in the reactor 110 the gas-liquid separation tank 130, and the second gas-liquid separation tank 50 are respectively 3.2 MPaG, 3.1 MPaG, and 0.5 MPaG.

It is assumed that the flow rate adjusting valves 22A and 22B, and the returning on-off valves 45A and 45B are switched to the closed state, and the on-off valves 31A and 31B, the discharging on-off valves 47A and 47B, and the on-off valves 142A and 142D are switched to the opened state.

In this state, in the cleaning device 1, a filtering operation for producing the product is performed.

That is to say, in the reactor 110, the FT synthesis reaction occurs according to the chemical reaction formula (1) described above, to produce a formed body such as carbon hydride in a gas or liquid form.

Due to a pressure difference between 3.2 MPaG of the reactor 110 and 3.1 MPaG of the gas-liquid separation tank 130, the formed body formed in the reactor 110 is contained in filtered fluid that has passed through the filters 111 and 112, and is fed by the first feed line 120. When the slurry or formed body in the reactor 110 is filtered, the catalyst adheres to the filters 111 and 112. On the other hand, filtered fluid fed by the first feed line 120 is accommodated in the first gas-liquid separation tank 130, and further, is fed out from the second feed line 150 and used for a liquid fuel product such as naphtha.

Then at time $T_a$ shown in FIG. 2, the reverse cleaning operation for removing the catalyst adhered to the filter 111 is performed by using the first reverse cleaning drum 20A. In other words, at time $T_a$, the first reverse cleaning drum 20A is set to a reverse cleaning state in which it is possible to perform the reverse cleaning operation.

Figure 3:
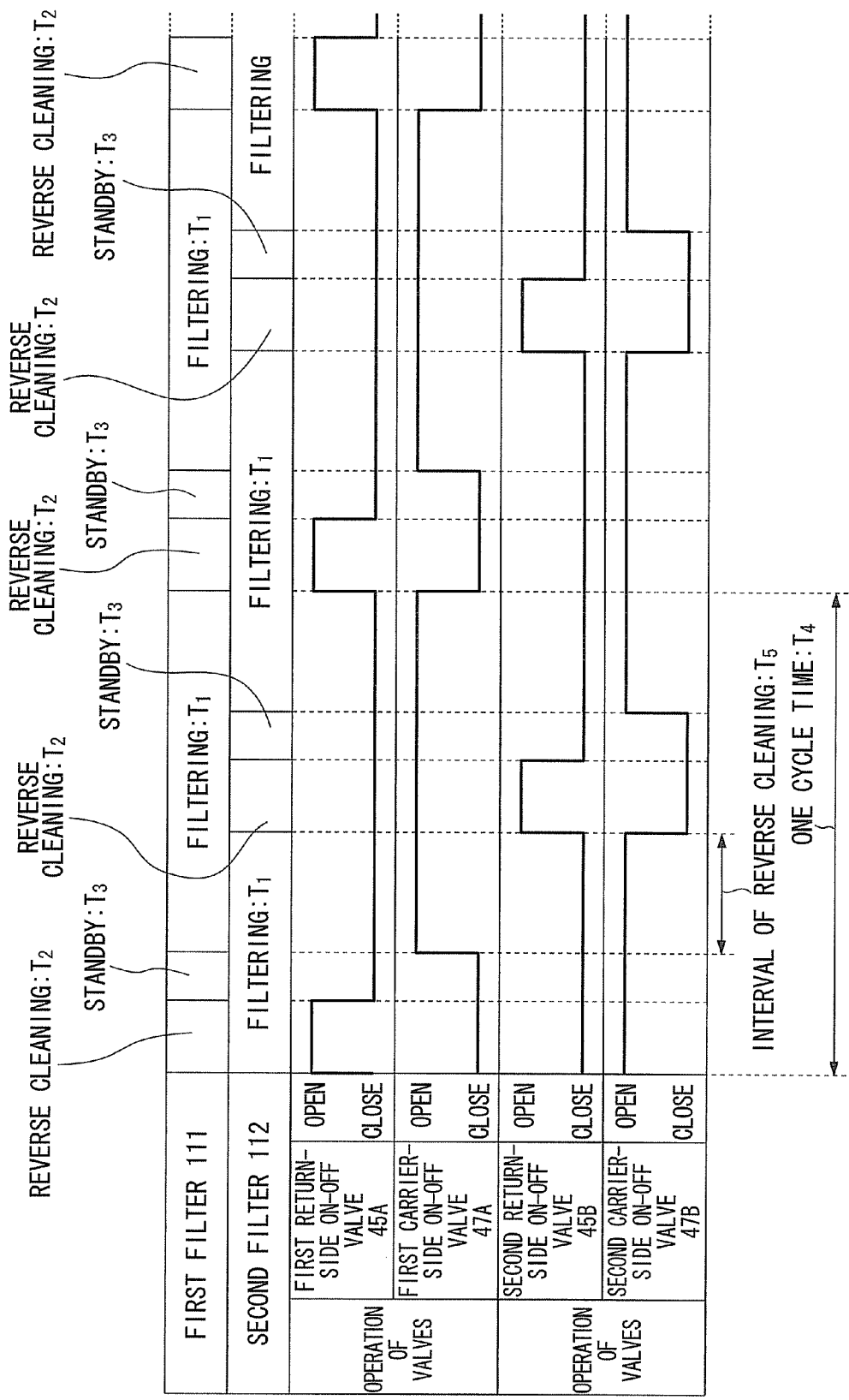
FIG. 3 is a diagram for explaining an operation of a filter of the filter cleaning apparatus.

That is, the on-off valve 31B and the first discharging on-off valve 47A are switched to the closed state, and the first returning on-off valve 45A is switched to the opened state during a period $t_2$ as shown in FIG. 3, so that filtered fluid in the first reverse cleaning drum 20A passes through the first filter 111 and flows into the reactor 110. The catalyst adhered to the first filter 111 is removed and flows into the slurry in the reactor 110. Thereafter, the filtering operation is performed by the first filter 111 by setting the operation of the filter 111 to a standby state during a period $t_3$, and then switching the first discharging on-off valve 47A to the opened state during a period $t_1$.

On the other hand, the second discharging on-off valve 47B is switched to the opened state during the period $t_1$ from time $T_a$ and the filtering operation is performed. Thereafter, by switching the second returning on-off valve 45B to the opened state during the period $t_2$, filtered fluid in the first reverse cleaning drum 20A passes through the second filter 112 and flows into the reactor 110, and the reverse cleaning operation for removing the catalyst adhered to the second filter 112 is performed. Thereafter, the operation of the first filter 111 is set to the standby state during the period $t_3$.

As explained to here, the reverse cleaning operation, the standby state, and the filtering operation related to the first filter 111, and the filtering operation, the reverse cleaning operation, and the standby state related to the second filter 112 becomes one cycle. The period required for one cycle is, respectively, a period $t_4$.

This one cycle is repeated for several times as shown in FIG. 2. Filtered fluid flows out from the first reverse cleaning drum 20A. However because compressed gas is supplied from the gas cylinder 132B to the first reverse cleaning drum 20A via the on-off valve 135B, the pressure of the first reverse cleaning drum 20A is maintained constant.

In the present embodiment, cleaning is not performed by using all the filters 111 and 112 at one time, but is staggered so that an interval of the reverse cleaning by the first filter 111 and the second filter 112 becomes a period $t_5$ (refer to FIG. 3). Therefore, the flow rate per unit time of filtered fluid flowing into the reactor 110 through the filters 111 and 112 can be made more constant, and production speed of the product can be made approximately constant. The height of the fluid level of filtered fluid in the first reverse cleaning drum 20A decreases stepwise with time.

On the other hand, as shown in FIG. 2, the pressure/cleaning solution replenishment operation for supplying filtered fluid to the second reverse cleaning drum 20B is performed after time $T_a$.

That is to say, the pressure control section 137C is controlled to switch an on-off valve 136C to the opened state while setting an on-off valve 135C to the closed state, thereby setting the pressure in the second reverse cleaning drum 20B to be lower than the pressure in the second gas-liquid separation tank 50, that is, to 0.0 MPaG (depressurization). Then the fluid level control section 143C switches the second flow rate adjusting valve 22B to the opened state, thereby replenishing a part of filtered fluid fed by the second feed line 150 to the second reverse cleaning drum 20B through the first return line 10 (replenishment of the cleaning solution). At this time, it is desired that the opening of the second flow rate adjusting valve 22B is adjusted so that the flow rate of the filtered fluid becomes a predetermined flow rate. Once filtered fluid has been supplied sufficiently to the second reverse cleaning drum 20B, the second flow rate adjusting valve 22B is switched to the closed state.

Moreover, the pressure control section 137C is controlled to switch the on-off valve 136C to the closed state and to switch the on-off valve 135C to the opened state, to supply compressed gas in the gas cylinder 132B to the second reverse cleaning drum 20B, thereby setting the pressure in the second reverse cleaning drum 20B to be higher than the pressure in the reactor 110 (pressure rising), that is, to 3.7 MPaG.

After one cycle including the reverse cleaning operation using filtered fluid in the first reverse cleaning drum 20A has been repeated for several times, at time $T_b$ shown in FIG. 2, the reverse cleaning operation for removing the catalyst adhered to the filter 111 is performed by using the second reverse cleaning drum 20B.

In the reverse cleaning operation, only the reverse cleaning drum that supplies filtered fluid is different from the reverse cleaning operation described above. Therefore, detailed explanation thereof is omitted.

On the other hand, after time $T_b$, the pressure/cleaning solution replenishment operation for replenishing filtered fluid to the first reverse cleaning drum 20A is performed. In the pressure/cleaning solution replenishment operation, only the reverse cleaning drum that replenishes filtered fluid is different from the pressure/cleaning solution replenishment operation described above. Therefore, detailed explanation thereof is omitted.

When one cycle including the reverse cleaning operation using filtered fluid in the second reverse cleaning drum 20B has been repeated for several times, as described above, it becomes time $T_c$.

The above-described procedures performed from time $T_a$ to time $T_c$ are repeated for a desired number of times, thereby preventing blockage of the filters 111 and 112 by using the cleaning device 1, and the product is continuously produced by the liquid fuel synthesis system 100.

If the flow rate of the formed body formed by the reactor 110 (production per unit time) is designated as $F_p$, and an average supply flow rate of filtered fluid supplied from the filters 111 and 112 is designated as $F_b$, filtering needs to be performed by the whole of the filters 111 and 112 at a filtering flow rate of $(F_p+F_b)$ $(=F_f)$ in order to maintain a constant height of the fluid level of the slurry in the reactor 110. The filtering flow rate $F_f$ is adjusted by a pressure difference between inside of the reactor 110 and inside of the gas-liquid separation tank 130. This is referred to as cascade control of the fluid level and pressure.

If the height of the fluid level in the reactor 110 tends to decrease, the pressure difference between the reactor 110 and the gas-liquid separation tank 130 is decreased by supplying compressed gas to inside the gas-liquid separation tank 130 by the pressure adjusting section 131A. Moreover if the height of the fluid level in the reactor 110 tends to increase, the pressure difference between the reactor 110 and the gas-liquid separation tank 130 is increased by decreasing the pressure in the gas-liquid separation tank 130 by the pressure adjusting section 131A.

The height of the fluid level in the gas-liquid separation tank 130 is adjusted to be constant. Consequently, a feed rate of filtered fluid to be supplied to the second gas-liquid separation tank 50 from the gas-liquid separation tank 130 becomes equal to $F_f$.

A product such as naphtha can be produced by recovering the formed body in filtered fluid fed from the second gas-liquid separation tank 50 through the second feed line 150, according to a well-known method.

When filtered fluid is fed from the second gas-liquid separation tank 50 to the first reverse cleaning drum 20A or the second reverse cleaning drum 20B, control is performed such that a fed amount per unit time is constant.

However, while the height of the fluid level in the first reverse cleaning drum 20A decreases from the high position H to the low position L, filtered fluid needs to be supplied from the second gas-liquid separation tank 50 until the height of the fluid level in the second reverse cleaning drum 20B is changed from the low position L to the high position H.

Accordingly, in FIG. 2, between time $T_a$ to $T_c$, if it is assumed that the time required for replenishing the cleaning solution is $T_f$, and the time for the state in which it is possible to perform the reverse cleaning is $T_o$, a flow rate $F_r$ for supplying filtered fluid to the second reverse cleaning drum 20B is set to a value obtained by the following equation (2).

$$F_r = F_b \times (T_o/T_f) \quad (2)$$

The height of the fluid level in the second gas-liquid separation tank 50 tends to decrease while the pressure of the second reverse cleaning drum 20B is reduced or boosted, or the second reverse cleaning drum 20B is in a standby state, because the flow rate of filtered fluid $(F_p+F_r)$ to be fed from the second gas-liquid separation tank 50 is increased more than the filtering flow rate $F_f$. That is, the height of the fluid level in the second gas-liquid separation tank 50 increases or decreases within a certain range.

In this manner, the operation for maintaining a constant amount to be filtered per unit time by the filters 111 and 112, and a constant production speed of the formed body can be performed.

However, when the height of the fluid level in the second gas-liquid separation tank 50 is increased too much, the cascade control of the fluid level and the flow rate of filtered fluid is performed so that the production speed of the formed body increases. When the fluid level in the second gas-liquid separation tank 50 decreases too much, the cascade control is performed so that the production speed of the formed body decreases.

As described above, the height of the fluid level in the gas-liquid separation tank 130 is adjusted to be constant, whereas the height of the fluid level in the second gas-liquid separation tank 50 increases or decreases within a certain range. As a result, filtered fluid in an amount corresponding to the volume of the reverse cleaning drums 20A and 20B can be stored in the second gas-liquid separation tank 50.

As explained above, according to the cleaning device 1 of the present embodiment, the pressure/cleaning solution replenishment operation of the second reverse cleaning drum 20B is performed while the catalyst adhered to the filters 111 and 112 is removed by filtered fluid in the first reverse cleaning drum 20A in the state in which it is possible to perform reverse cleaning. Moreover, the pressure/cleaning solution replenishment operation of the first reverse cleaning drum 20A is performed while the catalyst adhered to the filters 111 and 112 is removed by filtered fluid in the second reverse cleaning drum 20B in the state in which it is possible to perform reverse cleaning. These operations are alternately repeated. That is to say, filtered fluids in the first reverse cleaning drum 20A and the second reverse cleaning drum 20B are alternately used to clean the filters 111 and 112.

As a result, a situation in which the catalyst adhered to the filters 111 and 112 cannot be removed during the pressure/cleaning solution replenishment operation for supplying filtered fluid into the reverse cleaning drums 20A and 20B can be prevented, thereby enabling to decrease the interval of the reverse cleaning operation.

Moreover, a pump need not be provided as in the conventional filter cleaning apparatus, because the pressure in the reverse cleaning drums 20A and 20B needs only to be increased by the gas cylinder 132B or decreased by releasing gas to the atmosphere.

Because the cleaning device 1 includes the second gas-liquid separation tank 50, filtered fluid can be replenished into the first reverse cleaning drum 20A and the second reverse cleaning drum 20B in a short period of time by supplying filtered fluid after a sufficient amount of filtered fluid is stored in the second gas-liquid separation tank 50.

Moreover, the liquid fuel synthesis system 100 includes two each of the filters 111 and 112 and the auxiliary feed line 121 and 122, and the cleaning device 1 of the present embodiment includes two each of the auxiliary return line 42 and 43, the returning on-off valves 45A and 45B, and the discharging on-off valves 47A and 47B. Consequently, the on-off valve corresponding to each of the respective filters 111 and 112 is independently controlled, thereby enabling to stagger the time for cleaning the filters 111 and 112. As a result, blockage of the filters 111 and 112 can be efficiently prevented, and the production speed of the formed body can be stabilized by stabilizing the height of the fluid level in the reactor 110.

One embodiment of the present invention is explained above with reference to the drawings. However, the specific configuration is not limited to the embodiment, and also includes changes to the configuration without departing from the spirit and scope of the present invention.

For example, the construction is such that in the embodiment, the first filter 111 and the second filter 112 are provided as the filter, the first auxiliary feed line 121, the second auxiliary feed line 122, and the main feed line 123 are provided as the first feed line 120, the main return line 41, the first auxiliary return line 42, and the second auxiliary return line 43 are provided as the second return line 40, the first returning on-off valve 45A and the second returning on-off valve 45B are provided as the returning on-off valve, and the first discharging on-off valve 47A and the second discharging on-off valve 47B are provided as the discharging on-off valve.

However, the number of filters and the number of auxiliary feed line to be provided in the liquid fuel synthesis system 100, and the number of auxiliary return line, the number of returning on-off valves, and the number of discharging on-off valves provided in the cleaning device 1 are not limited, and it can be one or can be three or more.

In the embodiment including the liquid fuel synthesis system 100, the other ends of the first auxiliary feed line 121 and the second auxiliary feed line 122 are directly connected to the gas-liquid separation tank 130 without the main feed line 123. Similarly, in the cleaning device 1, the one end of the first auxiliary return line 42 and the one end of the second auxiliary return line 43 are directly connected the other end of the first switching line 32A of without the main return line 41.

Moreover in the embodiment, when capacities of the reverse cleaning drums 20A and 20B are comparatively small, the second gas-liquid separation tank 50 need not be provided in the cleaning device 1.

INDUSTRIAL APPLICABILITY

The present invention relates to a filter cleaning apparatus that removes a catalyst from a filter. According to the present invention, an interval of a reverse cleaning operation can be decreased without providing a pump for boosting the pressure of filtered fluid.

[Description of the Reference Symbols]
1 Cleaning device (filter cleaning apparatus)
10 First return line
20A First reverse cleaning drum (first reverse cleaning solution tank)
20B Second reverse cleaning drum (second reverse cleaning solution tank)
22A First flow rate adjusting valve
22B Second flow rate adjusting valve
30 Switching section
40 Second return line
41 Main return line
42 First auxiliary return line
43 Second auxiliary return line
45A First returning on-off valve
45B Second returning on-off valve
47A First discharging on-off valve
47B Second discharging on-off valve
50 Second gas-liquid separation tank (buffer tank)
100 Liquid fuel synthesis system (reaction system)
110 Reactor (reaction tank)
111 First filter
112 Second filter
120 First feed line
121 First auxiliary feed line
122 Second auxiliary feed line
123 Main feed line
130 Gas-liquid separation tank (recovery tank)
150 Second feed line

The invention claimed is:

1. A filter cleaning apparatus included in a reaction system, the reaction system being provided with: a reaction tank that can accommodate a catalyst and a formed body formed by a chemical reaction using the catalyst and that has a filter that filters the catalyst therein; a first feed line that is connected to the filter at one end and that feeds filtered fluid that has passed through the filter; a recovery tank that is connected to the other end of the first feed line and that accommodates the filtered fluid; and a second feed line that is connected to the recovery tank at one end and that feeds out the filtered fluid from the other end, and the filter cleaning apparatus is configured to remove the catalyst adhered to the filter, the apparatus comprising:

a first return line connected to an intermediate part of the second feed line at one end to feed the filtered fluid;
   a first reverse cleaning solution tank and a second reverse cleaning solution tank connected to the first return line and supplied with the filtered fluid;
   a first flow rate adjusting valve that can adjust a flow rate of the filtered fluid to be supplied from the first return line to the first reverse cleaning solution tank;
   a second flow rate adjusting valve that can adjust a flow rate of the filtered fluid to be supplied from the first return line to the second reverse cleaning solution tank;
   a switching section connected to the first reverse cleaning solution tank and the second reverse cleaning solution tank to feed either one of the filtered fluids accommodated in the first reverse cleaning solution tank and the second reverse cleaning solution tank by switching;
   second return line connected to the switching section at one end, provided with a returning on-off valve at an intermediate part, and connected to an intermediate part of the first feed line at the other end; and
   a discharging on-off valve provided on the first feed line so as to be closer to the other end of the first feed line than a portion of the first feed line at which the other end of the second return line is connected.

2. A filter cleaning apparatus according to claim 1, comprising a buffer tank for accommodating the filtered fluid on one end side of the second feed line from a portion of the second feed line to which one end of the first return line is connected.

3. A filter cleaning apparatus according to claim 1, wherein the reaction tank includes a first filter and a second filter as the filter, the first feed line includes:
a first auxiliary feed line connected to the first filter at one end;
a second auxiliary feed line connected to the second filter at one end; and
a main feed line connected to the other end of the first auxiliary feed line and the other end of the second auxiliary feed line at one end, and connected to the recovery tank at the other end,
the second return line includes:
a main return line connected to the switching section at one end;
a first auxiliary return line connected to the other end of the main return line at one end, and connected to an intermediate part of the first auxiliary feed line at the other end; and
a second auxiliary return line connected to the other end of the main return line at one end, and connected to an intermediate part of the second auxiliary feed line at the other end,
and the filter cleaning apparatus includes, as the returning on-off valve,
a first returning on-off valve provided at an intermediate part of the first auxiliary return line, and
a second returning on-off valve provided at an intermediate part of the second auxiliary return line, and
the filter cleaning apparatus further includes, as the discharging on-off valve,
a first discharging on-off valve provided on the other end side of the first auxiliary feed line from a portion thereof to which the other end of the first auxiliary return line is connected, and
a second discharging on-off valve provided on the other end side of the second auxiliary feed line from a portion thereof to which the other end of the second auxiliary return line is connected.

4. A filter cleaning apparatus according claim 2, wherein the reaction tank includes a first filter and a second filter as the filter,
the first feed line includes:
a first auxiliary feed line connected to the first filter at one end;
a second auxiliary feed line connected to the second filter at one end; and
a main feed line connected to the other end of the first auxiliary feed line and the other end of the second auxiliary feed line at one end, and connected to the recovery tank at the other end,
the second return line includes:
a main return line connected to the switching section at one end;
a first auxiliary return line connected to the other end of the main return line at one end, and connected to an intermediate part of the first auxiliary feed line at the other end; and
a second auxiliary return line connected to the other end of the main return line at one end, and connected to an intermediate part of the second auxiliary feed line at the other end,
and the filter cleaning apparatus includes, as the returning on-off valve,
a first returning on-off valve provided at an intermediate part of the first auxiliary return line, and
a second returning on-off valve provided at an intermediate part of the second auxiliary return line, and
the filter cleaning apparatus further includes, as the discharging on-off valve,
a first discharging on-off valve provided on the other end side of the first auxiliary feed line from a portion thereof to which the other end of the first auxiliary return line is connected, and
a second discharging on-off valve provided on the other end side of the second auxiliary feed line from a portion thereof to which the other end of the second auxiliary return line is connected.

* * * * *